Jan. 8, 1957   C. H. E. GUSTAFSON ET AL   2,776,556
DEVICES FOR THE TRANSMISSION OF POWER FROM THE ENGINE
OF A MOTOR VEHICLE TO THE DRIVEN WHEELS THEREOF
Filed June 19, 1952

INVENTORS
Carl Henning Emanuel Gustafson
Åke Oskar Johannes Larborn
BY Pierce, Scheffler & Parker
ATTORNEYS United States Patent Office 2,776,556
Patented Jan. 8, 1957

2,776,556

DEVICES FOR THE TRANSMISSION OF POWER FROM THE ENGINE OF A MOTOR VEHICLE TO THE DRIVEN WHEELS THEREOF

Carl Henning Emanuel Gustafson and Åke Oskar Johannes Larborn, Goteborg, Sweden, assignors to Aktiebolaget Volvo, Goteborg, Sweden, a corporation of Sweden Application June 19, 1952, Serial No. 294,444

3 Claims. (Cl. 64—27)

In rotating systems there occur critical speeds at which the systems are subject to torsional oscillations on account of resonance phenomena. In systems driven at a substantially constant speed it is a relatively simple matter to provide means so as to place the range of resonance outside the range of speed of operation. In systems rotating at varying speeds, the problem is more difficult to solve. This holds true particularly in the case of motor vehicles in which the engine is operating at variable speeds and with variable torques and in which the mass of the driven system is variable too.

This invention relates to a device for the transmission of power from the engine of a motor vehicle to the driven wheels thereof and has for its object to provide an improved construction eliminating resonance within the range of operation of the engine.

Figure 2:
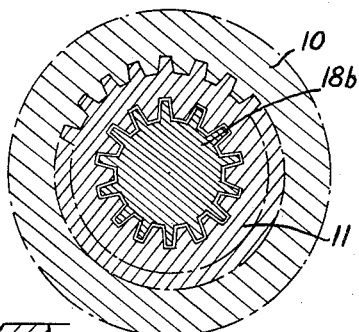
Figure 1:
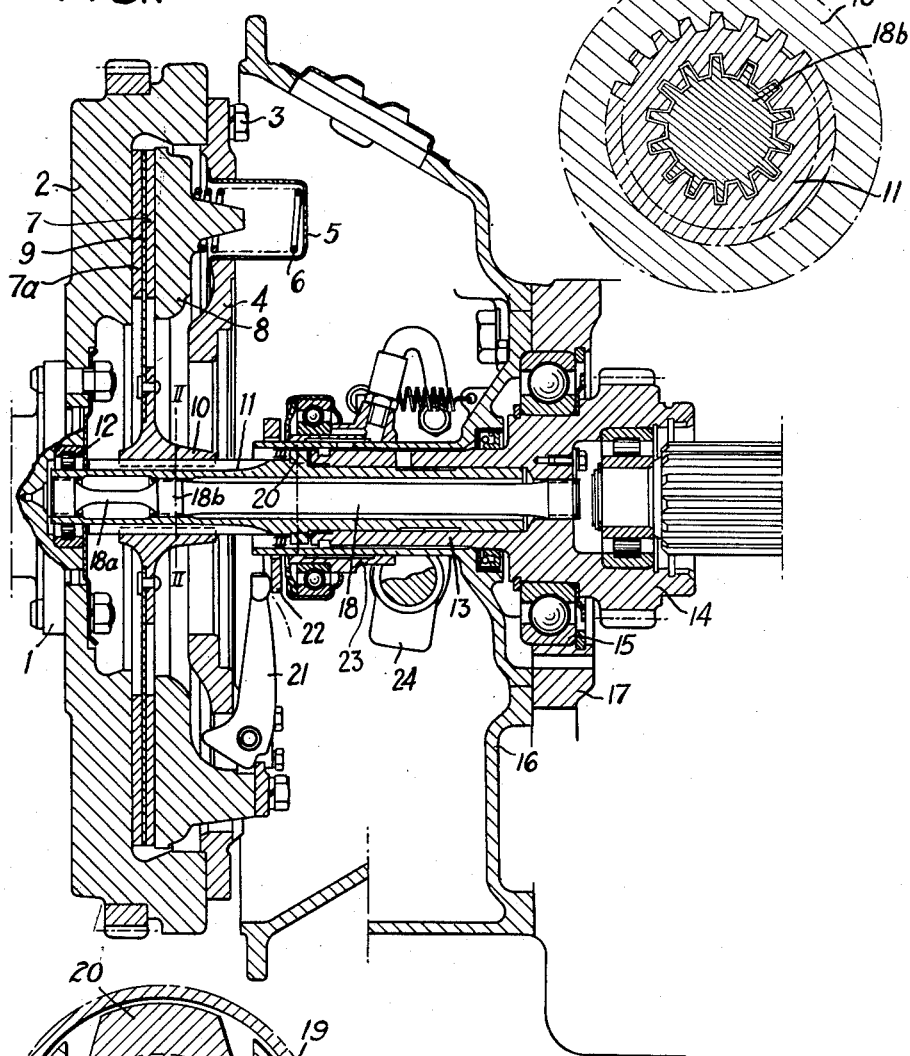
Figure 3:
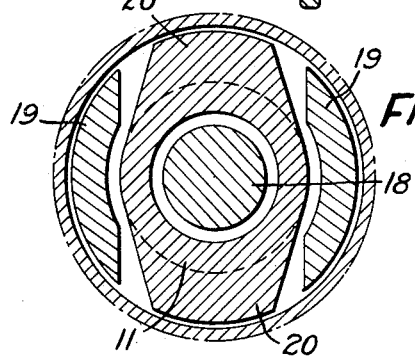

This object is attained by mechanism illustrated in the accompanying drawing, in which:

Fig. 1 is a sectional view of a friction clutch combined with a device according to the invention. Figs. 2 and 3 are transverse sections taken respectively on the lines II—II and III—III of Fig. 1.

Referring to Fig. 1, reference numeral 1 denotes the shaft of a vehicle engine, such as an internal combustion engine, said shaft having mounted thereon a fly wheel 2. By means of bolts 3, the fly wheel 2 has secured thereon an annular holder 4 for a number of pressure springs 6 housed in cups 5, said springs acting upon a ring 8 and tending to force said ring in the direction towards the fly wheel 2. Between the ring 8 and the fly wheel 2 there is provided an annular clutch plate 9 mounted on a hub 10 and having friction coatings 7 and 7a. The hub 10 is splined onto a tubular shaft 11 so as to be displaceable lengthwise thereon but not rotatable with respect to the shaft.

One end of the shaft 11 is mounted in a roller bearing 12 provided in a recess at the end of the shaft 1. The other end of the tubular shaft is telescopically placed within a tubular extension 13 of a pinion 14 mounted in a ball bearing 15 provided at the joint between a casing 16 for the clutch and a casing 17 for a gear box, not shown.

Within the tubular shaft 11 there is provided a rod-shaped torsion spring 18 connected with a torsion spring 18a of reduced diameter located near the shaft 1. The free end of the spring 18a is non-rotatably connected with the adjacent end of the shaft 11, and in a similar manner the free end of the torsion spring 18 is non-rotatably connected with the pinion 14. Between the two torsion springs there is provided an enlarged portion 18b having substantially the same diameter as the ends of the torsion springs. The portion 18b has axially extending projections engaging corresponding grooves in the inner face of the tubular shaft 11. As will be seen from Fig. 2, the widths of the projections and grooves are such as to provide for a certain clearance therebetween.

The free end of the tubular extension 13 of the pinion 14 is provided with two axially extending dogs 19 between which there extend radial projections 20 on the tubular shaft 11. Between the members 19 and 20 there are also provided clearances in a circumferential direction.

Fig. 1 further illustrates some operating members for the friction clutch, such as levers 21 mounted on the holder 4, only one of said levers being shown. The levers 21 are acted upon by an axially displaceable ring 22 which in turn is acted upon by an axially displaceable bearing 23 having an operating arm 24.

From the above description it will be evident that the torque from the shaft 1 is transmitted to the tubular shaft 11 by means of the fly wheel 2 and the plate 9. Small torques are transmitted via the torsion spring 18a and the torsion spring 18 to the pinion 14. If the torque increases, a certain torsion of the spring 18a causes the portion 18b to act as a substantially non-resilient clutch such as to have the exceeding torque transmitted by the torsion spring 18. If the torque further increases, the torsion spring 18 will be subject to a torsion having such a magnitude as to cause the projections 20 of the shaft 11 to come into contact with the dogs 19 of the elongation 13, the shaft 11 and the elongation 13 being thereby connected to each other in a substantially non-resilient manner.

From the above it will be evident that the two torsion springs can be subject merely to a certain limited load. Said springs are dimensioned in a manner such that the greatest torsion of the spring 18a will not occur when the engine is idling, whereas the greatest torsion of the spring 18 will occur only at a relatively great torque which is preferably greater than the maximum torque of the engine. Consequently, the dog clutch 19, 20 will become operative in emergency cases only, for instance at a rapid start with the engine racing. As a result thereof, the connection between the engine and the gear box will be resilient when the engine is idling, and the connection between the engine and the driven wheels of the vehicle will be resilient when the engine is loaded, the two torsion springs being dimensioned such that resonance will occur at a speed which is lower than the idling speed when the engine is idling and lower than the lowest operating speed when the engine is loaded. As a consequence thereof, detrimental torsional oscillations are prevented, and a rigid clutch plate may be used which is much more resistent than a resilient clutch plate. In addition, wear of the various members of the transmission device is reduced and disturbing noises in the gear box are avoided, and the vehicle will run more smoothly.

The expression "non-resilient clutch" used above means that the members of the clutch are dimensioned in the usual manner such as not to be subject to noticeable elastic deformation. For instance, a normally dimensioned shaft will in loaded condition be subject to a torsion of an angle of about $0.15°$ per foot length. As compared herewith, the torsion spring 18 has such a resiliency as to be subjected, when loaded, to a torsion corresponding to 6 to $7.5°$ per foot, which means that the maximum torsion of the spring in the above described transmission device will amount to $7–8°$.

The invention is not limited to the form of embodiment described and illustrated which may be modified within the scope of the appending claims. For instance, the additional spring device exemplified as an additional torsion spring 18a may be replaced by a spring device associated with the clutch plate, for instance of the type disclosed in the United States Patent No. 2,244,134.

What we claim is:

1. A non-vibratory torsionally resilient drive mechanism comprising a tubular shaft having means at the driven end thereof for connection to a source of power, a torsionally resilient rod coaxially arranged within said tubular shaft and secured thereto at said driven end, a driven element secured to the other end of said torsionally resilient rod, a set of splines on an intermediate point of said rod meshing with clearance with a cooperating set of splines on said tubular shaft to constitute a rigid driving connection between said rod and shaft upon torsion of the driven end portion of said rod, radial projections on said tubular shaft at a point between the splines thereof and said driven element, and axial projections on said driven element and spaced circumferentially from the radial projections of said tubular shaft to constitute a torsion-engaged rigid driving connection between said tubular shaft and said driven element.

2. A non-vibratory torsionally resilient drive mechanism as recited in claim 1, wherein the portions of said rod at opposite sides of the splines thereon have different cross sectional areas and hence are of different resiliency.

3. A non-vibratory torsionally resilient drive mechanism as recited in claim 2, wherein the driven end portion of said rod has the smaller cross sectional area and hence is the more resilient.

References Cited in the file of this patent
UNITED STATES PATENTS

| | | |
|---|---|---|
| 993,570 | Webster | May 30, 1911 |
| 1,978,922 | Wemp | Oct. 30, 1934 |
| 2,590,169 | Fritz | Mar. 25, 1952 |